H. E. M. STURGESS.
MOTOR CYCLE FRAME.
APPLICATION FILED APR. 1, 1918.
1,281,696.
Patented Oct. 15, 1918.
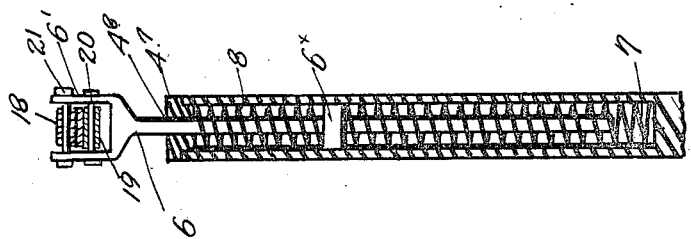
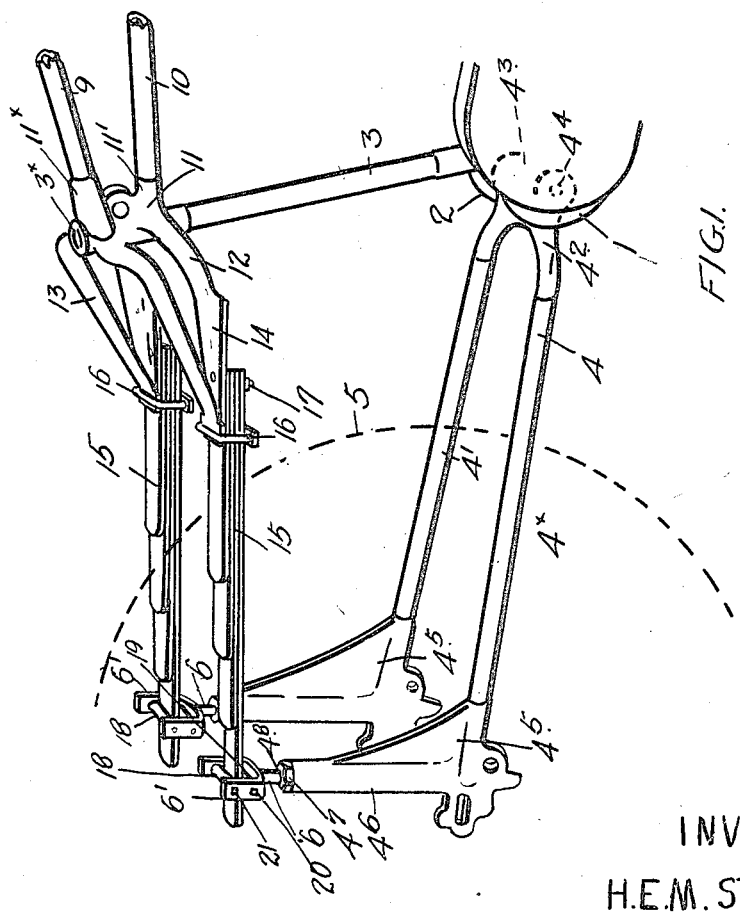
INVENTOr.
H.E.M. STURGESS.
By
Fetherstonhaugh & Co.
Attys.

UNITED STATES PATENT OFFICE.

HERBERT EDWARD MANSELL STURGESS, OF HAMILTON, ONTARIO, CANADA.

MOTOR-CYCLE FRAME.

1,281,696.

Specification of Letters Patent.

Patented Oct. 15, 1918.

Application filed April 1, 1918. Serial No. 226,132.

*To all whom it may concern:*

Be it known that I, HERBERT EDWARD MANSELL STURGESS, of the city of Hamilton, in the county of Wentworth, Province of Ontario, Canada, have invented certain new and useful Improvements in Motor-Cycle Frames, of which the following is the specification.

My invention relates to improvements in motor cycle frames and the object of the invention is to incorporate in the rear portion of such frame a shock absorbing mechanism which will absorb the shock on that portion of the frame carrying the rider and thereby render the machine more comfortable and smooth running by effectually preventing the rebound of the machine which is so uncomfortable in shock absorber mechanisms of this type now commonly in use.

A further object is to so construct the frame as to avoid lateral motion, and to decrease the number of joints and the consequent loosening thereof to effect wear and tear.

A still further object is to make the shock absorbing mechanism adjustable so as to suit the different weights of riders.

It will also be seen that I have disposed of the multiplicity of joints utilized in this class of devices thereby eliminating both lateral motion and wear and rendering the frame stronger more durable and rigid and yet with a better cushioning effect vertically.

In motor cycles of this class the rider has been resiliently supported when he travels over rough road the spring having a tendency to rebound against him making riding very uncomfortable. By my invention the rebound is taken up by an auxiliary spring thereby producing a cushioning effect and making the riding comfortable.

My invention consists essentially of the following arrangement and construction of parts as hereinafter more particularly explained.

Figure 1 is a general perspective view of the rear portion of a motor cycle frame constructed in accordance with my invention.

Fig. 2 is an enlarged sectional detail through the rear stays of the frame showing the rebounding spring.

In the drawings like letters of reference indicate corresponding parts in the various figures.

1 and 2 indicate the usual side plates from which the vertical tubular member 3 of the frame extends and which carries the seat post in the open upper end $3^x$. 4 indicates the rear fork of the machine comprising the members $4^x$ and $4'$. The forward ends of the members $4^x$ and $4'$ are connected together by a fork bracket $4^2$ having a tubular inner end $4^3$ extending between the plates 1 and 2 and pivotally secured therebetween by a cross bolt $4^4$ extending through the sleeve $4^3$ and the plates 1 and 2. Each member $4^x$ and $4'$ is provided at its rear end with a bearing bracket $4^5$ between which the rear wheel indicated by dotted lines 5 is carried in the usual manner. The brackets $4^5$ are provided with upwardly extending tubular standards $4^6$. $4^7$ indicates a nut threaded in the upper end of each tubular standard $4^6$ provided with a central orifice $4^8$. 6 indicates a vertical rod which extends through the tubular orifice $4^8$ and vertically of the tubular standard $4^6$. The rod 6 intermediately of its length is provided with an enlargement $6^x$.

7 indicates a compression spring extending between the bottom of the tubular standard $4^6$ and the enlargement $6^x$. 8 indicates a compression spring extending between the enlargement $6^x$ and a closing nut $4^7$. The compression spring 7 is intended to absorb the initial shock, the spring 8 taking up the rebound occurring thereafter.

The upper end of the rod 6 is provided with a fork $6'$. 9 and 10 indicate the upper reach bars of the motor cycle frame which extend forwardly to the front forks. 11 indicates a connecting bracket into which the upper end of the tube 3 extends and to which the rear ends of the reaches 9 and 10 are secured in the tubular portions $11^x$ and $11'$ thereof.

The bracket 11 is provided with rearwardly extending lower fork members 12 and rearwardly extending upper fork members 13 which incline downwardly so as to merge into the fork members 12. The fork members 12 are provided with laterally flattened portions 14.

15 indicate leaf springs, which are secured at their inner ends to the rear ends of the fork members 12 and 13 by U-bolts 16 and bolts 17. The lowermost member of the leaf members 15 extends into the forks $6'$ between rollers 18 and 19 mounted on cross bolts 20 and 21. By this means a sliding movement is provided for the ends of the leaf springs 15 between the rollers 18 and 19 as the rod 6 is carried up and down by the force of the shock.

From this description it will be seen that I have devised a very simple device whereby the frame of a motor cycle is so constructed as to form shock absorbing means which will take up the shock and rebound upon the frame during the travel of the motor cycle and thereby render the motor cycle smooth running and comfortable to the rider.

What I claim as my invention is:

1. In a motor cycle frame, the combination with the side plates, the tubular member extending therefrom, and rearwardly extending upper fork members connected with said tubular member and having yieldable extensions, of a rear fork pivoted between the side plates, and resilient means for supporting the upper fork extensions upon the rear ends of the rear fork members.

2. In a motor cycle frame, the combination with the side plates, a tubular member extending therefrom, and rearwardly extending upper fork members connected with said tubular member, of a rear fork pivoted between the side plates, flat leaf springs forming extensions to the upper fork members, and a resilient support for supporting the free ends of the leaf springs upon the ends of the rear fork members.

3. In a motor cycle frame, the combination with the side plates, a tubular member extending therefrom and rearwardly extending upper fork members connected with said tubular member, of a rear fork pivoted between the side plates, the members of which are provided at their rear ends with upwardly extending tubular standards, a vertical rod resiliently held within such standards from vertical movement, leaf springs forming extensions to the upper fork members, and means for freely supporting the free ends of the leaf springs upon the upper ends of the vertical rods.

4. In a motor cycle frame, the combination with the side plates, a tubular member extending therefrom and rearwardly extending upper fork members connected with said tubular member, of a rear fork pivoted between the side plates, the members of which are provided at their rear ends with upwardly extending tubular standards, a vertical rod resiliently held within such standards from vertical movement, leaf springs forming extensions to the upper fork members, forks forming the upper ends of the vertical rods, and parallel horizontal rollers carried by the forks between which the end portions of the leaf springs extend.

5. In a motor cycle frame, the combination with the side plates, a tubular member extending therefrom and rearwardly extending upper fork members connected with said tubular member, of a rear fork pivoted between the side plates, the members of which are provided at their rear ends with upwardly extending tubular standards, vertical rods held within such standards provided with enlargements intermediately of their length and compression springs inserted within such standards at each side of such enlargement, a closure for the upper ends of the standards, leaf springs forming extensions to the upper fork members, and means for freely supporting the free ends of the leaf springs upon the upper ends of the vertical rods.

6. In a motor cycle frame the combination with the side plates, a tubular member extending upwardly therefrom and the upper fork member connected with said tubular member and having resilient arms, of a rear lower fork member pivoted between the side plates and a rebounding cushioning means interposed between the rear ends of the resilient arms and the lower fork member.

7. In a motor cycle frame the combination with the side plates, a tubular member extending upwardly therefrom and the upper fork member connected with said tubular member and having resilient arms, of a rear lower fork member pivoted between the side plates, compression springs and rebounding springs suitably held and interposed between the rear ends of the resilient arms and the lower fork members.

8. In a motor cycle frame the combination with the side plates, a tubular member extending upwardly therefrom and the upper fork member connected with said tubular member and having resilient arms, of a rear lower fork member pivoted between the side plates, tubular standards connected to the rear ends of the lower fork, a compression spring located in each standard, a support for the rear ends of the resilient arms extending into the standard and bearing on the compression spring and a rebounding spring in each standard extending between the lower end of the support and a fixed top on the standard.

9. The combination with the side plates and vertical tubular member and the upper and lower rearwardly extending forks connected with said tubular member of the tubular standards connected with the rear ends of the lower forks, and compression and rebounding springs located in the same, the upper forks being provided with springs co-acting with the springs of the standards.

HERBERT EDWARD MANSELL STURGESS.

Witness:
LAURA BOWRON.

Copies of this patent may be obtained for five cents each, by addressing the "Commissioner of Patents, Washington, D. C."